June 29, 1954    L. J. HAWORTH    2,682,657
INDICATOR APPARATUS FOR RADIO OBJECT LOCATION SYSTEMS
Filed Oct. 26, 1945    4 Sheets-Sheet 3
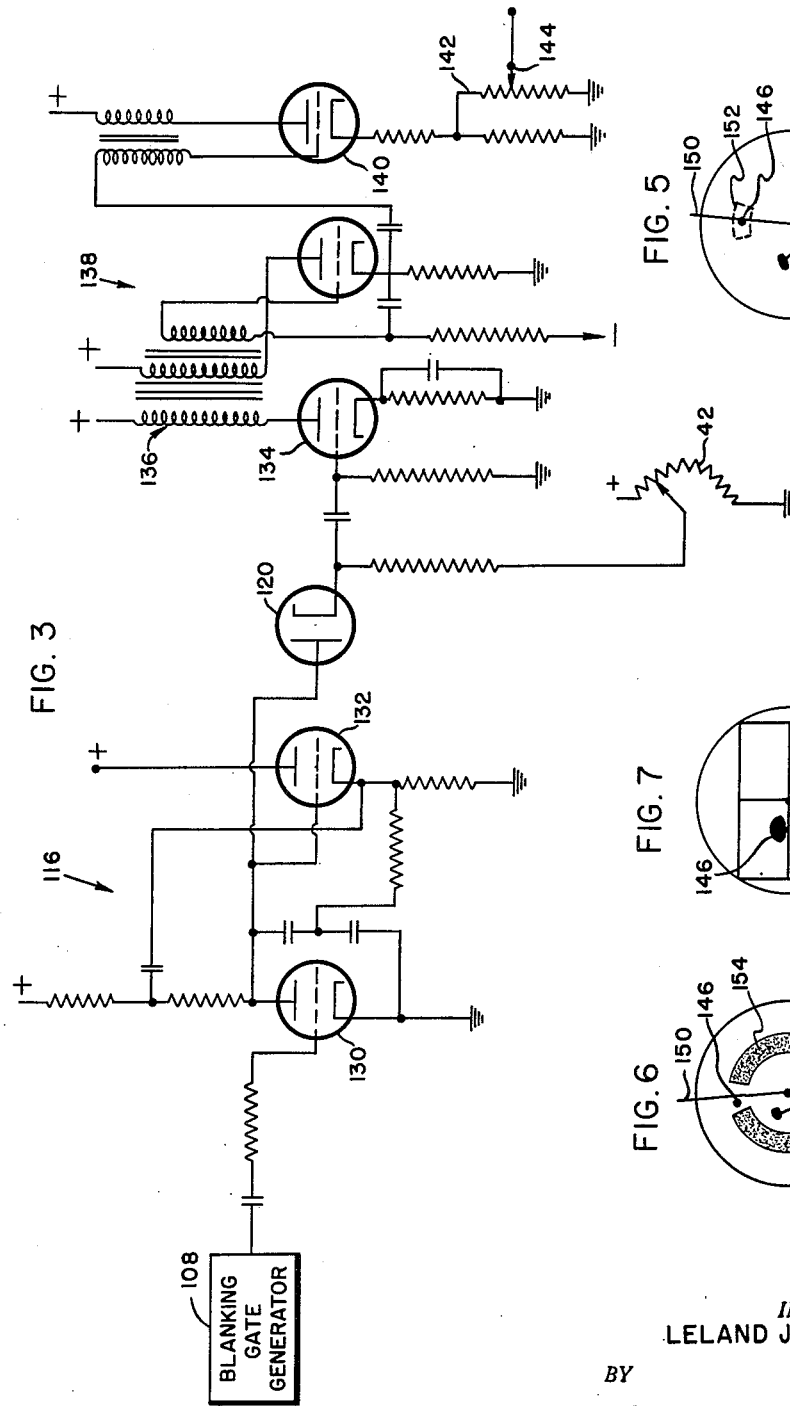
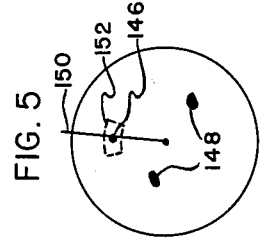
FIG. 5
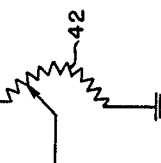
FIG. 7
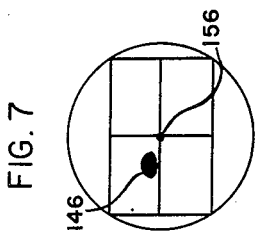
FIG. 6
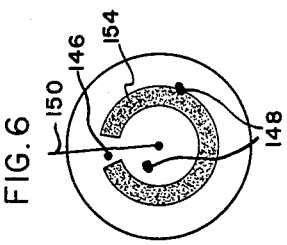
FIG. 3
INVENTOR.
LELAND J. HAWORTH
BY
William D. Hall
ATTORNEY

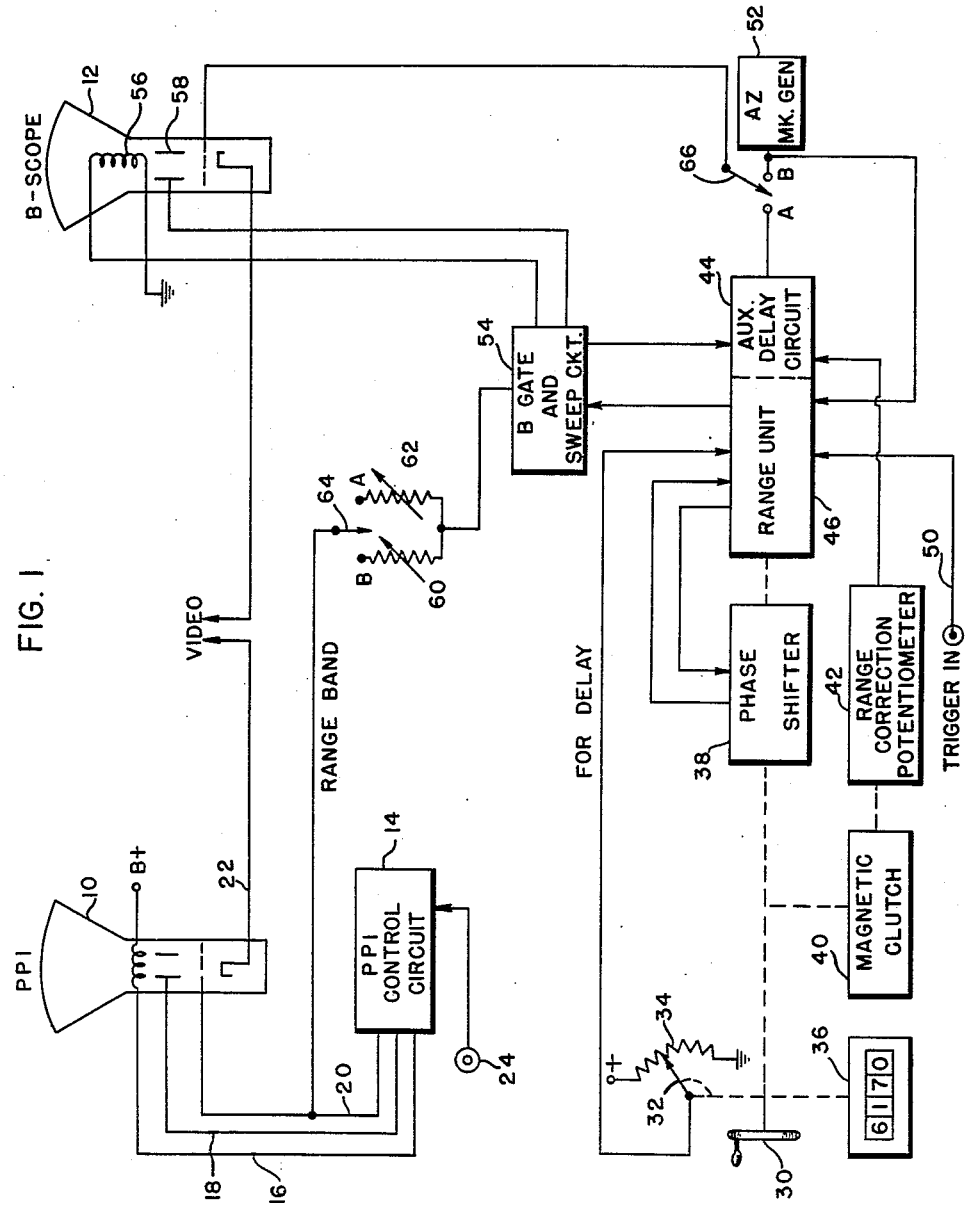

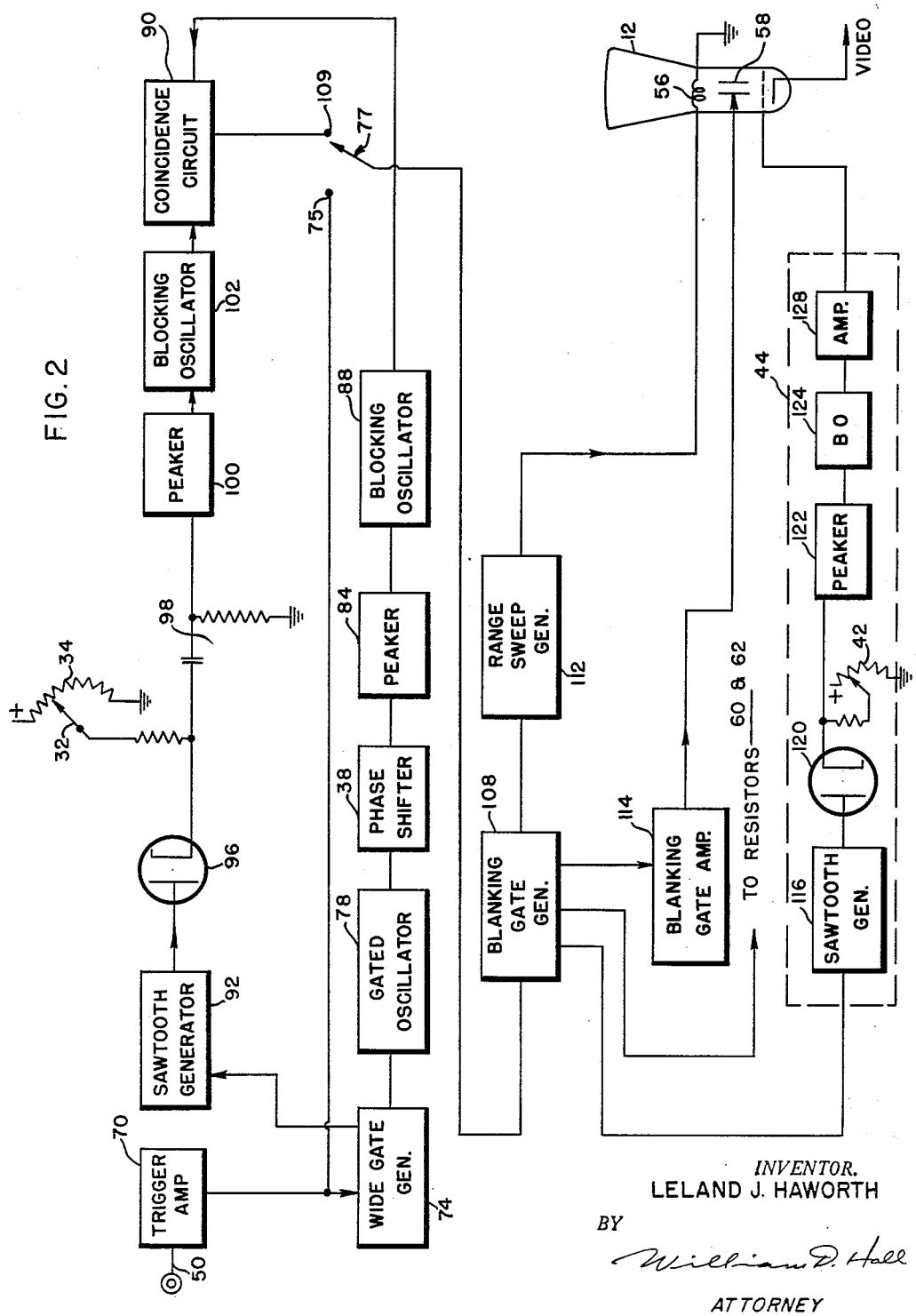

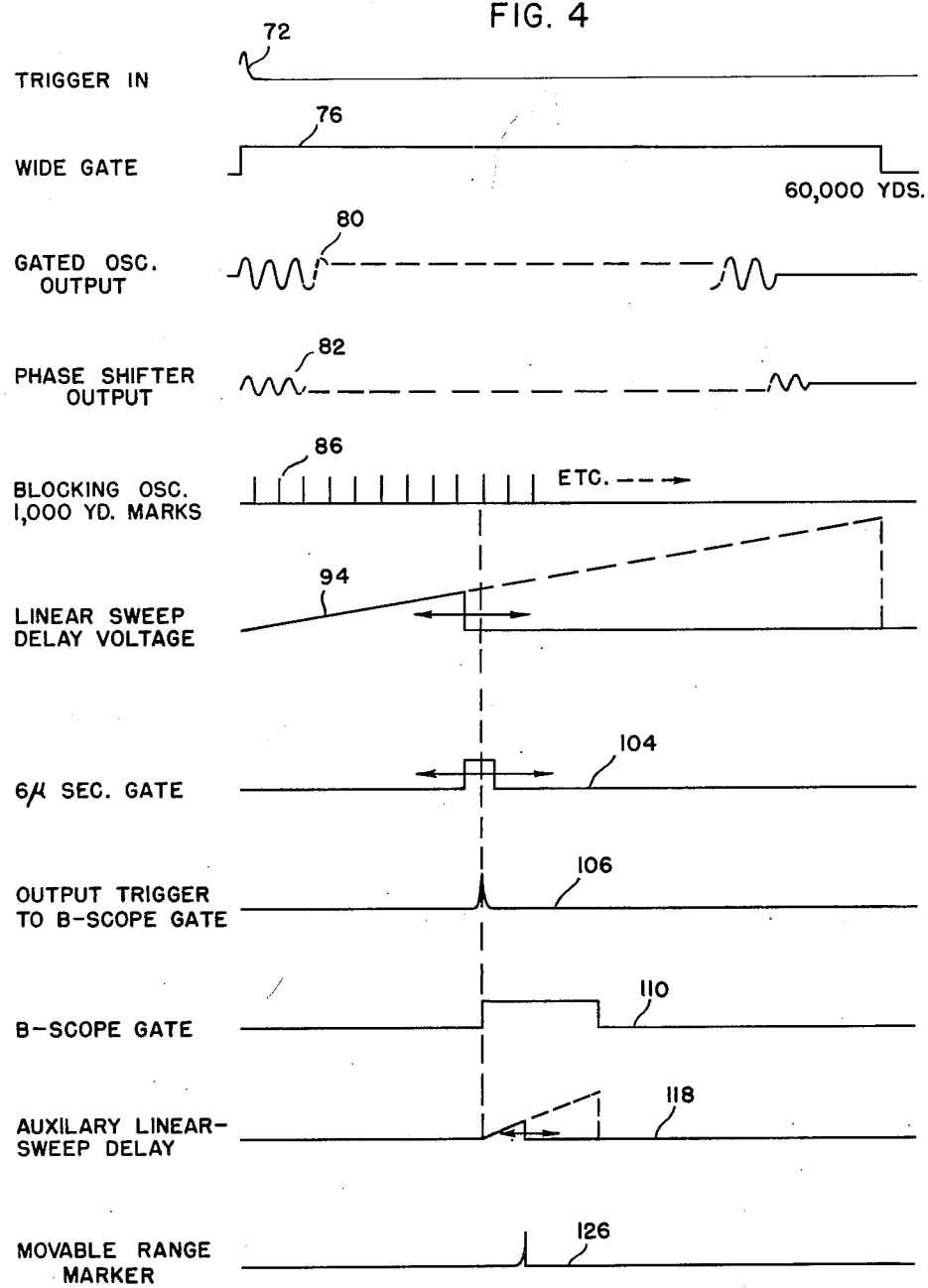

Patented June 29, 1954

2,682,657

UNITED STATES PATENT OFFICE 2,682,657

INDICATOR APPARATUS FOR RADIO OBJECT LOCATION SYSTEMS

Leland J. Haworth, Belmont, Mass., assignor, by mesne assignments, to the United States of America as represented by the Secretary of War Application October 26, 1945, Serial No. 624,904

6 Claims. (Cl. 343—11)

1

This invention relates to electrical apparatus and more particularly to cathode ray tube indicators.

Many radio object-locating systems employ a type of indicator commonly known as a plan-position indicator or P. P. I. in which a target indication is made to appear as a bright spot on the fluorescent screen of a cathode ray tube. The distance from the center of the cathode ray tube to the bright spot, or target indication as it is normally called, is proportional to the distance from the target causing this spot to the radio object-locating system. The angle between a radius passing through the target indication and any other radius taken as reference is proportional to the azimuth angle to the target with respect to any arbitrary reference direction. In order to interpret the information presented on the P. P. I., radio object-locating systems employ range and azimuth markers controlled by handwheels that may be moved so that their point of intersection corresponds with a selected target indication. These markers may be etched lines on a suitable transparent material that is superimposed on the face of the cathode ray tube and moveable relative thereto or they may be electrically produced bright lines on the fluorescent screen of the cathode ray tube. It is usually not possible to position these markers to the desired degree of accuracy by use of the plan-position indicator alone since the area covered by the plan-position indicator may represent an area of the terrain within a 100-mile radius of the radio object-locating system. A type of vernier indicator employing a B scope has been developed to aid in positioning the markers on the plan-position indicator. The B scope is a type of indicator in which a bright spot is made to appear on the fluorescent screen of a cathode ray tube in a position that is indicative of the range and azimuth of the target causing the indication. The azimuth of the target is represented by the horizontal sweep of the cathode ray tube and the range to the target from some arbitrary reference point is displayed on the vertical sweep of the cathode ray tube. In the copending application of Leland J. Haworth, Serial No. 608,157, filed August 1, 1945 now U. S. Patent 2,653,312, dated September 22, 1953, there was disclosed a circuit of such a plan position indicator and vernier B scope. In this copending application the range and azimuth markers on the plan position indicator were adjusted to the approximate position of the selected target indication. When this adjustment had been made,

2 the area selected for display on the B scope contained the target indication. After the area displayed on the B scope had been scanned by the radio object-locating system, a bright spot was made to appear at the center of the B scope. This bright spot was moved in range and azimuth by rotating the same handwheels controlling the position of the markers on a plan position indicator. By moving this bright spot to coincide with the target indication appearing on the B scope, the range and azimuth markers on the plan position indicator are made to accurately intersect at the point of the target indication. Several magnetic clutches were provided for alternately connecting and disconnecting the B scope control circuits.

The movement in range of the spot on the B scope in the above mentioned copending application was accomplished by switching from the sweep potentiometer normally employed when target indications were to be presented to an auxiliary range correction potentiometer that is used in making adjustment. While this arrangement is satisfactory and workable, it is found more desirable in certain applications to employ the same sweep on the B scope during the time that the area is being scanned and during the time that the auxiliary spot is being positioned on the B scope. It is also desirable at times to place a suitable marker on the plan position indicator to indicate the sector that is being displayed on the B scope.

It is an object of this invention therefore, to provide an improvement in the means for applying and moving the above mentioned auxiliary spot in range on the B scope.

It is a further object of this invention to provide means for indicating on the plan position indicator associated with this B scope the sector of the P. P. I. scan that is displayed on the auxiliary scope.

For a better understanding of the invention, together with other and further objects thereof, reference is had to the following description taken in connection with the accompanying drawings in which:

Fig. 1 is a block diagram of the range control circuits of an indicator system employing a plan position indicator and a B scope;

Fig. 2 is a second block diagram showing in greater detail a portion of the circuit of Fig. 1;

Fig. 3 is a schematic wiring drawing showing in greater detail a portion of the circuit of Fig. 2;

Fig. 4 is a series of waveforms that may be obtained from the circuit of Fig. 1;

Fig. 5 is a view of the plan position indicator screen as it would appear in the above mentioned copending application;

Fig. 6 is a view of the plan position indicator as it would appear in this invention; and Fig. 7 is a view of the B scope as it would appear in this invention.

Referring now to Fig. 1, there is shown two cathode ray tubes 10 and 12. In this embodiment of the invention cathode ray tube 10 is connected as a plan position indicator and cathode ray tube 12 is connected as a B scope. Only those elements necessary for the operation of this invention are shown in cathode ray tubes 10 and 12. The plan position indicator control circuit, illustrated schematically by block 14, provides a sweep for tube 10 that is applied through connection 16. An unblanking gate is applied to tube 10 through connection 18, and an intensity control voltage is applied through connection 20. Video signals representing target echoes are applied to the cathode of tube 10 by way of connection 22. The above mentioned signals exclusive of the video signal to tube 10 are controlled and synchronized by means of an input trigger applied through connection 24. Means for producing voltages that will perform these operations are well known in the electronic art.

The operation of the B scope range control circuits is controlled through a range handwheel 30. Range handwheel 30 is mechanically coupled to the contact arm 32 of a potentiometer 34, a revolution counter 36, a phase shifter 38, and a magnetic clutch 40. Magnetic clutch 40 is in turn mechanically connected to a range correction potentiometer 42. Range correction potentiometer 42 is electrically connected to an auxiliary delay circuit 44. A range unit 46 electrically associated with auxiliary delay circuit 44 receives signals from potentiometer 34, phase shifter 38, a trigger input connection 50 and an azimuth mark generator 52. Azimuth mark generator may be any type of pulse generator that will produce sharp voltage pulses at regular intervals as the antenna rotates in azimuth. One form of azimuth mark generator is a disk with radial slots adapted to be rotated by the antenna. A light source above the disk causes pulses of light to fall on a photo cell below the disk. The photo cell will transform the light pulses into voltage pulses. Range unit 46 supplies signals to phase shifter 38, to auxiliary delay circuit 44, and to a gate and sweep circuit 54 associated with B scope 12. The gate and sweep circuit 54 applies a range sweep to the vertical deflection coil 56 of B scope 12 and an intensifying impulse to the accelerating anode 58 of tube 12 as well as supplying a signal to auxiliary delay circuit 44 and to two mixing resistors 60 and 62. Mixing resistors 60 and 62 are alternately connected to the intensity grid of cathode ray tube 10 by means of a switch 64. The switching from position A to B is synchronized with the antenna rotation, resistance 60 being in circuit during the time the area displayed on the B oscilloscope is being scanned and resistance 62 being in circuit during the remainder of the time. The intensity grid of tube 12 is alternately connected to auxiliary delay circuit 44 and azimuth mark generator 52 by means of a switch 66. Video signals representing target echo are applied to the cathode of tube 12.

Briefly, the operation of the circuit of Fig. 1 is as follows. A synchronizing trigger applied at connection 24 causes P. P. I. control circuit 14 to supply a sweep voltage and an intensifying pulse to cathode ray tube 10. Video signals applied to the cathode of tube 10 cause bright spots to appear on the face of this tube at a position representing the position in range and azimuth of the object producing these video signals. A similar trigger is applied through connection 50 to range unit 46. Handwheel 30 through potentiometer 34 and phase shifter 38 cause the range sweep that is applied to tube 12 by circuit 54 to be delayed by a time proportional to the amount of rotation of handwheel 30. This causes a certain band in range of the area displayed on the plan position indicator to be applied to the B scope. An azimuth sector of this range band is selected by azimuth selector circuits similar to those disclosed in the above mentioned copending application. These azimuth selecting circuits are not shown in Fig. 1. A signal applied to the intensity grid of tube 10 through mixing resistors 60 and 62 causes a band of light to appear on the face of tube 10 at a range corresponding to the range band displayed on the B scope. After the sector displayed on the B scope has been scanned, switch 66 connects auxiliary delay circuit 44 to the intensity grid of B scope 12. Auxiliary delay circuit 44 causes a bright spot to appear on the face of cathode ray tube 12 at a range controlled by range correction potentiometer 42. The method by which this spot is made to appear, together with the reason for causing this spot to appear, will become apparent as the description proceeds.

Referring now to Fig. 2, there is shown in more detail the circuits included in range unit 46 and the auxiliary delay circuit 44. The circuit of auxiliary delay circuit 44 is enclosed in the dashed line bearing this reference character. The connection 50 shown in Fig. 1 is the input connection to a trigger amplifier 70. The signal that is supplied to trigger amplifier 70 is shown by waveform 72, Fig. 4. The output of trigger amplifier 70 is applied to a wide gate generator 74 and to a contact 75 of a switch 77. Generator 74 may be any of the various types of gate generators well known in the art, for example, the so called one-shot or flip-flop multivibrator circuit. The output of gate generator 74 is shown as waveform 76 of Fig. 4. Waveform 76 of Fig. 4 is shown as a sixty thousand yard gate, that is, it has a time duration approximately equal to the time it takes a pulse of electromagnetic energy to travel sixty thousand yards and return. It is to be understood, of course, that this distance is used for the purpose of illustration only, and it is not intended that this invention be limited to this particular distance or time. The output of gate generator 74 is applied to a gated oscillator 78. This oscillator produces a sine wave that will have approximately sixty complete cycles in the time represented by wide gate 76. The output of gated oscillator 78 is shown as waveform 80, Fig. 4. The sine wave voltage from oscillator 78 is applied to phase shifter 38. This is the same phase shifter that is shown connected to handwheel 30 in Fig. 1. The sine wave output of phase shifter 38 shown as waveform 82, Fig. 4, is applied to a peaking circuit 84. Peaking circuit 84 produces a series of sharp voltage pulses from the sine wave input voltage. Circuits for performing this operation are well known in the art and will not be described further. The output of peaker 84, therefore, is a series of phasable pulses, that is the position of the pulses are continuously movable in time, controlled in position by phase shifter 38 which is in turn controlled by range handwheel 30 of Fig. 1. These phasable pulses are shown in waveform 86, Fig. 4. The output of peaker 84 controls the operation of a blocking oscillator 88. Again, blocking oscillator circuits are well known in the art and, therefore, require no explanation. Each pulse from peaker 84 causes blocking oscillator 88 to fire and thus apply a sharp voltage pulse to a coincidence circuit 90.

The output of gate generator 74 is also applied to a sawtooth voltage generator 92. The output of sawtooth generator 92, shown as waveform 94 of Fig. 4, is applied to the anode of a diode vacuum tube 96. The cathode of tube 96 is connected through a resistor to contact arm 32 of resistor 34. Resistor 34 is as shown in Fig. 1. This resistor is connected between a positive potential and ground and therefore, the cathode of tube 96 will be at some positive potential determined by the position of tap 32. It will be remembered that the position of tap 32 is controlled by the position of handwheel 30, Fig. 1. As soon as the output of sawtooth generator 92 exceeds the potential of the cathode of tube 96, this tube will conduct and cause a signal to be applied through coupling network 98 to a peaker circuit 100. Peaker circuit 100 may be any of the circuits well known in the art that will produce a sharp voltage pulse from the comparatively broad input pulse applied through coupling network 98. Peaker 100 controls the operation of a blocking oscillator 102. Blocking oscillator 102 produces a comparatively wide pulse as compared to the narrow pulse produced by oscillator 88. The pulse produced by oscillator 102 is approximately equal to the time interval between successive pulses in the output of oscillator 88. The output of oscillator 102 is shown as waveform 104, Fig. 4. Coincidence circuit 90 produces a pulse whenever the pulse from oscillator 102 coincides with a pulse from oscillator 88. This output pulse from oscillator 90 is shown as waveform 106, Fig. 4. The potential to which resistor 34 is connected is so selected that the pulse in waveform 104 may be moved over approximately the whole time interval represented by wide gate 76. It is usually desirable to use a so-called helipot for potentiometer so that the resistance is continuously variable over several revolutions of the potentiometer shaft. One revolution of the phase shifter would in this case move the phasable pulse in time by an amount substantially equal to the amount that the pulse of oscillator 102 moves in time for one revolution of potentiometer 34. It can be seen, therefore, that the pulse in waveform 106 is continuously variable from the time of the trigger illustrated by waveform 72 until the end of the wide gate shown in waveform 76. The output of coincidence circuit 90 is applied to a blanking gate generator 108 through a contact 109 on switch 77. Generator 108 is similar to generator 74 except that generator 108 produces a gate of much shorter time duration than does generator 74. The length of this gate will be determined by the range band that is to be displayed on the B scope. If, for example, a two thousand yard range sector is to be displayed on the B scope, the width of the gate produced by generator 108 will be approximately equal to the time that it takes a pulse of electromagnetic energy to travel two thousand yards and return. The output of generator 108 shown as waveform 110, Fig. 4, is applied to a range sweep generator 112, a blanking gate amplifier 114 and two resistors 60 and 62, Fig. 1. Blanking gate amplifier 114 produces a gate of sufficient amplitude so that when this gate is applied to the accelerating anode 58 of tube 12, the electron beam on tube 12 will have a sufficient velocity to cause a luminous spot to appear on the face of tube 12. Range sweep generator 112 is a sawtooth generator that causes the electron beam to sweep linearly over the face of the cathode ray tube. Generator 112 is connected to the vertical deflection coil 56 of tube 12. The positive gate as applied to resistors 60 and 62 of Fig. 1 causes a band of light referred to above as a range band to appear on the face of the plan-position indicator. This range band is illustrated in Fig. 6. Switch 64, Fig. 1, is in position B during the time that the sector displayed on the B oscilloscope is being scanned and in position A during the remainder of the time; therefore, resistors 60 and 62 are employed to control the relative intensity of the range band appearing on the screen of the plan position oscilloscope thus indicating the sector scanned on the B oscilloscope.

Referring once more to Fig. 2, the output of gate generator 108 is applied to sawtooth generator 116 in the auxiliary delay circuit 44. The output of generator 116, shown as waveform 118 of Fig. 4, is applied to the anode of a diode vacuum tube 120. The cathode of tube 120 is connected to peaker circuit 122 and to a tap on range correction potentiometer 42. Range correction potentiometer 42 is connected between a source of positive potential and ground. When the output of sawtooth generator 116 exceeds the potential on the cathode of tube 120, a signal will be applied to peaker 122. The output of peaker 122 is connected to a blocking oscillator 124 which produces a sharp voltage pulse at the time the signal is received from peaker 142. The output of blocking oscillator 124 is shown as waveform 126, Fig. 4. The output from blocking oscillator 124 is applied through an amplifier 128 to the control grid of tube 12 between scans as will be explained hereinbelow. Immediately after the B scan period (position B of the switches) switch 66 disconnects the azimuth marker circuit of the B oscilloscope and connects the auxiliary delay switch 44. This switch allows a spot which is caused by the pulse output of amplifier 128 to appear on the face of the B oscilloscope between scans. The spot first appears in the mid-range position (middle of the screen), but may be moved in range by adjusting the range correction potentiometer 42. The latter is mechanically connected to range handwheel 30 by magnetic clutch 40, said clutch being energized between scans. By moving the spot until it appears at the same range as the target the proper correction is made in the other delay circuits adjusted by handwheel 30 so that on the next scan the target will appear centered in range on the screen of the B oscilloscope. The range counter 36 indicates the true range at the instant the spot is placed on the target. A release and pull-back mechanism operated by a cam (shown in above-noted copending application) restores the range correction potentiometer in time for the next scan period.

Switch 77 normally connects coincidence circuit 90 to blanking gate generator 108 but if it is desired to display an area on the B scope that is immediately adjacent to the radio object locating system switch 77 may be moved manually or automatically to contact 75 so that the B scope control circuits are controlled directly by the output of trigger amplifier 70.

Referring now to Fig. 3, there is shown in greater detail the components of the auxiliary delay circuit 44. Blanking gate generator 108 of Fig. 2 supplies a negative gate pulse to the control grid of a vacuum tube 130 which forms a part of a conventional sawtooth generator circuit. Vacuum tube 130, together with vacuum tube 132, and the associated resistors and capacitors, make up the sawtooth generator 116 of Fig. 2. The anode of vacuum tube 130 is connected to the anode of vacuum tube 120. The cathode of tube 120 is connected to the tap on resistor 42 as has already been explained in connection with Fig. 2. The cathode of tube 120 is connected through a conventional resistor-capacitor coupling circuit to the grid of a peaker circuit containing a vacuum tube 134. Peaker circuit 134 serves to form a sharp voltage pulse at the time that tube 120 starts to conduct. The output of tube 134 is coupled through transformer winding 136 to the input of a blocking oscillator 138. Blocking oscillator 138 is electrically connected to the input of an amplifier 140. A resistor 142 having a movable tap 144 provides a means for obtaining a voltage pulse of variable amplitude that may be used to intensify a cathode ray tube. Tap 144 is connected to the intensity grid of the cathode ray tube between scans through switch 66, Fig. 1.

Referring now to Fig. 5, there is shown a view of the screen of the cathode ray tube that forms part of the plan position indicator in the above mentioned copending application. Dark spots 146 and 148 represent target echoes on the fluorescent screen of this tube. The azimuth marker employed in this system is represented by line 150, and the area enclosed by the dotted line 152 represents the sector as displayed on the auxiliary B-scope. In the above mentioned copending application no means for defining the area represented by dotted line 152 was shown.

Referring now to Fig. 6, there is shown the fluorescent screen of the cathode ray tube that forms a part of the plan position indicator in this invention. Dark spots 146 and 148 represent the same target indications that were shown in Fig. 5. The azimuth marker employed in this system is again represented by line 150. A band of light known as a range band is represented by the shaded area 154. The range band forms a complete ring on the face of the tube with the exception of a small area in the vicinity of azimuth marker 150. It is this area in which the range band does not appear that is displayed on the auxiliary B-scope indicator. It can be seen, therefore, that the area displayed on the auxiliary indicator is clearly defined on the plan-position indicator.

Fig. 7 is a view of the B-scope screen employed in this invention. Target indication 146 is represented by the shaded area bearing this reference character. The auxiliary spot that is used to accurately position the range band and the azimuth marker on the plan position indicator is represented by spot 156. Spot 156 is shown at the intersection of a horizontal and a vertical line that intersect in the center of the B-scope screen. These lines may or may not be etched on the face of the B-scope screen as the particular situation may dictate.

Referring once again to Fig. 1 for a summary of the operation of this circuit, in the above mentioned copending application the type of control circuit employed in this invention was fully described. Briefly, it consists of positioning a range and azimuth marker on a P. P. I. by means of two handwheels or other control devices.

By means of microswitches or cams associated with the rotating antenna of this system switches are positioned so that the B-scope is connected properly to display the normal B-scope presentation when the antenna passes through the area that has been for display on the B-scope. Immediately after the area represented by the B-scope has been scanned the various switches move to a position such that an auxiliary spot appears at the center of the B-scope and the position controls of this spot are mechanically connected through magnetic clutches to the position controls of the azimuth and range markers. The position of the switches when the area displayed on the B-scope is being scanned is marked B; the other position is marked A. The ratio of movement of the auxiliary spot on the B-scope to the movement of the markers on the P. P. I. is such that moving the auxiliary spot on the B-scope to coincide with any target indication appearing thereon causes the markers on the P. P. I. to intersect at the true position of the target indication on the P. P. I. Revolutions counters or similar indicators are used to accurately indicate the position in range and azimuth of the target indication.

A synchronizing pulse is applied at connection 24, causing P. P. I. control circuit 14 to produce the proper sweep and intensifying voltages so that the normal P. P. I. picture appears on the screen of cathode ray tube 10. At the same time a synchronizing trigger that is applied to connection 50 causes range unit 46 to produce a voltage gate that is applied to gate and sweep circuit 54 at a time after the synchronizing trigger that is determined by the position of phase shifter 38 and tap 32 on resistor 34. Upon receipt of this gate voltage, circuit 54 produces a range sweep and an intensifying pulse for cathode ray tube 12. A positive pulse is also supplied by circuit 54 through resistors 60 and 62 to the control grid of tube 10. This gate produces the range band 154 of Fig. 6. Video signals that are applied to the cathode of tube 12 cause bright spots on the screen of this tube similar to that shown as target indication 146 of Fig. 7. During the time that the radio object-locating system is scanning the area displayed on the B-scope, switch 66 is in position B, and therefore an azimuth mark is applied to the intensity grid of tube 12. Immediately after the area displayed on the B-scope has been scanned, switches 64 and 66 move to the position marked "A." At this time the movable range marker shown in waveform 126, Fig. 4, is applied to the intensity grid of tube 12. Range correction potentiometer 42 is normally positioned so that this spot appears in the center of the B-scope screen as shown by spot 156, Fig. 7. At the same time switches 64 and 66 move to the position marked "A" magnetic clutch 40 is energized in the manner shown in the above mentioned copending application. Handwheel 30 is then rotated until spot 156 moves to a position on B-scope 12 that corresponds in range to the position of a target indication 146. Spot 156 is also moved in azimuth to a position corresponding to the azimuth of spot 146 by a handwheel not shown in this invention but shown in the above mentioned copending application. Rotating handwheel 30 to position potentiometer 42 also changes the position of potentiometer 34 and phase shifter 38 so that spot 146 will appear at the center of the B-scope screen next time the area represented by this scope is scanned by the radio object-locating system. Range band 154 and range revolution counter 36 are also positioned so that they accurately represent the range to the target causing target indication 146. When the antenna of the radio object-locating system again moves in position so that the area displayed on the B-scope is being scanned, switches 64 and 66 again move to the position marked B, causing a decrease in intensity of the range band of tube 10 and removal of the spot 156 on tube 12. At the same time clutch 40 is deenergized, thus allowing potentiometer 42 to resume its normal position.

Some of the advantages of this invention are:

1. The area displayed on the auxiliary indicator is clearly shown on the plan position indicator.

2. The range sweep on the B-scope is accomplished by the same circuits during the scanned sector and also during the time that corrections in position of the range and azimuth markers are being made.

3. The position of the auxiliary spot is controlled by a simple delay circuit that is almost identical to the circuit that causes the initial delay in the B-scope sweep.

Where there has been described what is at present considered the preferred embodiment of the invention, it will be obvious to those skilled in the art that various changes and modifications may be made therein without departing from the invention.

What is claimed is:

1. In an indicator circuit for use with a radio object locating system, a range measuring circuit comprising first and second cathode ray tube indicators having intensity control elements, means for producing a first range sweep on said first cathode ray tube, a first delay means for generating a first voltage pulse a predetermined time after the start of said first range sweep on said first cathode ray tube indicator, means for causing said first voltage pulse to initiate a second range sweep on said second cathode ray tube indicator, means for simultaneously applying echo signals to said intensity control elements of said first and second cathode ray tube indicators, means for causing said echo signals applied to said second cathode ray tube indicator to cause visual indications to appear on the screen of said second indicator during a selected sector of indication on the screen of said first cathode ray tube indicator, a second variable delay means for producing a second voltage pulse a predetermined time after the generation of said first voltage pulse, means for causing said second voltage pulse to produce a luminous indication on said second cathode ray tube indicator at a time when said echo signals do not cause an indication, means including a magnetic clutch for mechanically coupling said second variable delay means to said first variable delay means so that the area in range selected for display on said second cathode ray tube indicator is centered in range about a selected target indication when the indication caused by said second voltage pulse is moved into range coincidence with the indication caused by the echo signal representing said selected target, means for indicating on said first cathode ray tube indicator the area displayed on said second cathode ray tube indicator, and means coupled with said first variable delay means for accurately indicating the range to a selected target.

2. In an indicator circuit for use with radio object locating systems, a range measuring circuit comprising a first cathode ray tube indicator for indicating on the fluorescent screen thereof the range and azimuth of objects in a comparatively large area, a second cathode ray tube indicator indicating on the screen thereof the range and azimuth of targets in a selected portion of the area displayed on said first indicator, means for causing a luminous reference marker to appear on the screen of said second cathode ray tube, first control means for moving said reference marker in range on said second indicator, second control means for selecting the range of the area displayed on said second cathode ray tube indicator, means for intermittently adjusting said first control means and said second control means in unison so that the area selected for display on said second indicator is centered in range about a selected target indication when said reference marker is moved to coincide in range with said target indication, means for indicating on said first indicator the area selected for display on said second indicator, and means for indicating the range to the center of the area displayed on said second indicator.

3. An indicator system for a radio object location system comprising means including a first cathode ray tube indicator for displaying echo signals received from objects in a given two-dimensional area, a beam intensity control element for said tube, means including a second cathode ray tube indicator for displaying echo signals received from objects in a given range section of the area displayed on said first indicator, generator means connected to said first indicator for producing range sweeps thereon at a desired frequency, means coupled to said range sweep generator for generating at said desired frequency square wave signals, each having a duration equal to the range section visible on said second cathode ray tube indicator, and having a delay with respect to the initiation of each range sweep equal to the range delay of the range section displayed on said second cathode ray tube indicator, and means for impressing said square wave signals on said intensity control element of said first cathode ray tube indicator.

4. An object range indication system for a radio object location system comprising a first cathode ray tube indicator having a persistent screen, deflection means for periodically sweeping the cathode rays of said tube across two coordinates of said screen, one of said coordinates indicating range, means for rendering echo signals received from objects in a given area visible on said screen during separate given periods, marker pulse generator means connected to said last-named means for producing a marker spot on said screen during intervals intermediate said given periods, adjustable means for shifting said marker spot along said range coordinate, and means coupled to said adjustable means for translating the position of said marker spot into range information, whereby the range of any object may be determined by adjusting the position of said marker spot so that it coincides in range with the persistent image of the echo signal received from said object.

5. An object range indication system according to claim 4, further including means for simultaneously shifting the indication of the range to the center of the given area displayed on said indicator at the same rate as the shifting of said marker spot along said range coordinate.

6. An object range indication system according to claim 5, further including a second cathode ray tube indicator, means for rendering echo signals received from objects in a geographic area including said given area visible on said second indicator, means for demarcating on said second indicator the area corresponding to said given area of said first indicator, and means for simultaneously shifting the indication of the range of the center to the given area which is demarcated on said second oscilloscope at the same rate as the shifting of said marker spot along said range coordinate.

References Cited in the file of this patent

UNITED STATES PATENTS

| Number | Name | Date |
| --- | --- | --- |
| 2,355,363 | Christaldi | Aug. 8, 1944 |
| 2,395,966 | Goldberg | Mar. 5, 1946 |
| 2,414,486 | Rieke | Jan. 21, 1947 |
| 2,416,088 | Deerhake | Feb. 18, 1947 |
| 2,421,747 | Engelhardt | June 10, 1947 |
| 2,422,697 | Meacham | June 24, 1947 |
| 2,426,217 | Hoisington | Aug. 26, 1947 |
| 2,454,782 | De Rosa | Nov. 30, 1948 |
| 2,471,408 | Busignies | May 31, 1949 |
| 2,512,703 | Wilkerson | June 27, 1950 |
| 2,592,855 | Bowen et al. | Apr. 15, 1952 |

FOREIGN PATENTS

| Number | Country | Date |
| --- | --- | --- |
| 552,072 | Great Britain | Mar. 22, 1943 |